United States Patent [19]

Shemenski, Sr.

[11] 4,283,460
[45] Aug. 11, 1981

[54] AROMATIC TRIAZOLES AND ALKYLAMINE BORATES FOR INCREASED SURFACE PROTECTION AND IMPROVED ADHESION OF BRASS-COATED STEEL TO RUBBER

[75] Inventor: Robert M. Shemenski, Sr., North Canton, Ohio

[73] Assignee: The Goodyear Tire & Rubber Company, Akron, Ohio

[21] Appl. No.: 147,818

[22] Filed: May 8, 1980

Related U.S. Application Data

[62] Division of Ser. No. 567,586, Apr. 14, 1975.

[51] Int. Cl.³ .................. B32B 9/00; B32B 15/06; D02G 3/00; B44D 1/42
[52] U.S. Cl. ........................... 428/389; 148/6.14 R; 152/356 R; 156/124; 427/384; 427/435; 428/390
[58] Field of Search .............. 156/110 A, 124, 316, 156/308; 152/356 R, 359; 148/6.14 R; 427/384, 435; 428/389, 390

[56] References Cited

U.S. PATENT DOCUMENTS

| | | | |
|---|---|---|---|
| 3,360,390 | 12/1967 | Thompson et al. | 427/180 X |
| 3,846,160 | 11/1974 | Hirakawa et al. | 156/124 X |
| 4,169,112 | 9/1979 | Elmer et al. | 260/42.22 X |

FOREIGN PATENT DOCUMENTS 2611761 10/1976 Fed. Rep. of Germany .

*Primary Examiner*—Michael R. Lusignan
*Attorney, Agent, or Firm*—H. C. Young, Jr.

[57] ABSTRACT

The vulcanized, aged, adhesion of rubber to brass-coated steel cord is improved by the use of benzotriazole (BTA) and cyclohexylamineborate (CHAB). The BTA and CHAB are used alone or in combination. They are added directly to the surface of the cord or to the rubber immediately adjacent to the cord. BTA treatment will reduce surface contamination of the cord. CHAB will aid in improving aged adhesion.

14 Claims, No Drawings

AROMATIC TRIAZOLES AND ALKYLAMINE BORATES FOR INCREASED SURFACE PROTECTION AND IMPROVED ADHESION OF BRASS-COATED STEEL TO RUBBER

This is a Division, of application Ser. No. 567,586 filed Apr. 14, 1975.

This invention relates to increased surface protection of brass-coated steel and improved vulcanized adhesion between brass-coated steel and rubber. More particularly, this invention relates to improved factory processing of brass-coated steel tire cord by increasing maximum storage life and minimizing surface contamination of brass-coated steel tire cord, in addition to improving adhesion between brass-coated steel cord and rubber in steel-belted reinforced pneumatic vehicle tires.

Pneumatic vehicle tires are often reinforced by means of brass-coated steel cord. This tire cord is frequently high-carbon steel or high-carbon steel coated with a thin layer of alpha brass. Such brass-coated steel tire cord requires special care during factory processing to minimize surface contamination. Good adhesion to rubber requires a clean surface. It is important that the initial or original adhesion between the steel tire cord and the rubber immediately adjacent thereto be satisfactory to provide structural integrity to the composite. Further, it is important that this adhesion level be retained as much as possible throughout the service life of the product. Industry is therefore investigating various ways of protecting brass-coated steel tire cord prior to rubber encapsulation and improving both initial adhesion and aged-adhesion.

Clean, untreated brass-coated steel wire will normally have sufficient good initial adhesion to the adjacent rubber. However, the adehsion usually will drop with time, i.e., with aging due to heat, stress and/or chemical degradation or corrosion effects. Other additives described in the literature have been tried which improve both initial and aged adhesion. Yet these additives have not proved satisfactory either due to required complexities in their preparation or the mixed results realized from their use, i.e., some types of aging would show improved adhesion and others show no improvement. It is therefore desirable that an agent be found which protects the bare metallic surface and does not adversely affect initial adhesion to any great degree, while at the same time proving aged-adhesion of a vulcanized composite. Lastly, it is necessary that such processing ultimately improve aged-adhesion be relatively simple and therefore economically feasible in competitive manufacturing.

A method for preventing deterioration of adhesion between metal cord and rubber has been taught in Belgian Pat. No. 786,059 and German Pat. No. 2,227,013. This method advises dipping the cord into a mineral oil solution of a salt of an organic acid and a long-chain aliphatic amine, or in a mixture of this solution and a very low level of benzotriazole. However, the success of this method requires preparing and combining organic compounds in an oil solvent. This processing is not ideally suited to a manufacturing operation in a competitive market where economics and simplicity are at a premium.

It is an object of the present invention to provide a technique to protect and to maintain a clean surface on brass-coated steel through inventory storage and factory processing. Further, it is an object of the present invention to provide a method for improving initial or original adhesion between brass-coated steel and rubber. It is another object of the present invention to provide a method for improving aged-adhesion between brass or brass-coated steel tire cord and the rubber immediately adjacent thereto. In addition, it is the object of the present invention to accomplish these goals efficiently in a manner economically feasible for use in competitive manufacturing of steel/rubber composites. Other objects will become apparent as the description proceeds.

The objects of the present invention are accomplished by using either benzotriazole or cyclohexylamine borate (salt of cyclohexylamine and boric acid), or both to treat brass-coated steel cord. The benzotriazole (BTA) and/or cyclohexylamine borate (CHAB) are used either to coat the metal and/or are added to the rubber immediately adjacent to the metal. The manner in which these agents are added to the rubber or placed onto the surface of the metal is not important to the performance per se of the present invention, but only to the degree of performance and ease of manufacturing. When added to the rubber, standard milling and/or Banburying procedures can be used. Alternatively, for example, BTA can be added to the rubber latex before coagulation. The metal can be coated by applying a solution or suspension of BTA, CHAB, or BTA plus CHAB to the metal and evaporating the solvent or suspending medium. For example, tire cord can be dipped into an aqueous or alcoholic solution of BTA and dried by a blast of hot air. An alcoholic solution (e.g. methanol, ethanol or isopropanol) can be quickly evaporated from the wire surface, thereby reducing the possibility of surface corrosion which is detrimental to rubber-metal adhesion. Faster drying also allows greater economics in manufacturing due to faster production rates. Water, however, is preferred if adequate drying facilities are available. The foregoing are illustrative methods and not limiting. The method by which the cord comes in contact with the BTA and/or CHAB is not important. In fact, various methods can be used in combination, separately and directly to the surface of the cord. The order of addition is not critical. Where both the BTA and CHAB are used, they may be added alone or in combination to the rubber and/or directly to the surface of the cord. If added separately the order of addition to the rubber and/or surface of the cord is not critical. The amount of BTA added to the rubber can vary from about 0.01 part to about 2.0 parts by weight per 100 parts by weight of rubber, preferably 0.05 to 1.0 part and most preferably 0.10 to 0.50 part. The amount of CHAB added to the rubber can vary from about 0.1 part to about 3.0 parts by weight per 100 parts by weight of rubber, preferably 0.50 to 2.0 parts. In this respect, consideration must be given to the degree of compatibility of the BTA and/or CHAB with the rubber compound as well as the effect of these agents upon the particular vulcanization system selected for vulcanizing the rubber. When BTA is applied to the metal in solution form, e.g., as an aqueous or alcoholic solution, the concentration of BTA in solution is from 0.10 weight percent to 4.0 weight percent, preferably 0.1 to 2.0 weight percent. CHAB can be applied to brass-coated steel surfaces by using alcoholic solutions containing 0.01 molar to 2.0 molar cyclohexylamine borate, preferably 0.01 molar to 1.0 molar.

As indicated earlier, the method of applying BTA and/or CHAB to a metallic surface is not critical. For example, another alternative method involves the addition of BTA or CHAB to the medium or agent used to lubricate brass-coated steel wire during the final drawing process. However, as with the rubber compound, care must be exercised to use a lubricant that is compatible with the BTA and CHAB, i.e., the lubricant must retain its lubricating properties and not decompose upon addition of the BTA or CHAB. Naturally any combination of these methods can be used, as mentioned earlier herein.

Benzotriazole alone has been found to protect brass-coated steel tire cord during inventory storage and factory processing prior to rubber encapsulation. Cyclohexylamine borate increased the aged-adhesion of vulcanized brass-coated steel plus rubber composites. However, it has been discovered that the use of BTA together with CHAB results in an optimum combination of surface protection of brass-coated steel prior to rubber encapsulation, plus adhesion promoting effects in the vulcanized brass-coated steel/rubber composite. This combined effect can be realized, for example, by dissolving BTA and CHAB together in a single alcoholic solution (e.g., methyl or ethyl alcohol) and dipping brass-coated steel into this solution, or by preparing separate solutions of BTA and CHAB and dipping the metal sequentially. The order of the sequential dipping process is not important. The metal surface must be adequately dried after dipping. The weight ratio of BTA to CHAB is normally from 1:10 to 25:1, preferably from 1:1 to 10:1. These ratios are guidelines only and in no way intended to be limitations.

The brass coating of a typical brass-coated steel cord is microscopically porous, thereby exposing small areas of steel surface to any surrounding environment. It is believed that BTA interacts with copper in a brass coating to form a polymeric complex of BTA plus copper. This polymeric complex is insoluble in most solvents and serves as a protective barrier to any environmental degradation of the underlying brass. On the other hand, CHAB, it is theorized, interacts with iron and iron oxide from steel surfaces exposed through microscopic pores to form an iron boro-ferrite compound which protects the steel. It is not necessary that the barrier layers of polymeric complexes adsorbed BTA/CHAB be extremely thick. In fact, such layers should not be so thick as to preclude all migration of copper from the brass through the protective coating to the rubber interface. Adhesion of rubber to metal cord requires the formation of copper-sulfur bonds. It is believed that adsorbed excess amounts of BTA and/or CHAB serve as a reservoir to complex with new steel surfaces exposed or additional copper released during service of a rubber produced reinforced with treated cord.

It is not practical to describe the weights of polymeric complex to be formed or the amounts of BTA and CHAB to be applied much less the thickness of the respective barrier layers. Optimum thicknesses and amounts are a function of variables such as nature of the brass surface, viz., mode of deposition, thickness of initial oxide layers, magnitude of residual stresses, copper content, brass thickness, as well as the reactivity of the rubber-vulcanization system. However, as very general guidelines, but not in any sense limitations, the total barrier layers should nominally be less than 100 angstroms and preferably not in excess of 1000 angstroms.

The practice of the present invention results in increased surface protection of brass-coated steel prior to rubber encapsulation and improved aged-adhesion, in many cases with improved initial, i.e., original adhesion of vulcanized brass-coated steel/rubber composites.

The rubber surrounding the metal can be any rubber, preferably diene rubbers such as natural rubber, rubbery copolymers of butadiene with styrene or acrylonitrile, polybutadiene and polyisoprene and can be compounded in any of the conventional manners, e.g., with carbon black, sulfur, etc. However, as recited earlier, the effect of the BTA and/or CHAB on vulcanization systems should be considered and the vulcanization system adjusted accordingly.

Aged metal to rubber adhesion is particularly poor when the rubber contains oxygen, moisture, and an amine resin capable of releasing ammonia. For example, rubbers containing hexamethylenetetramine (HMTA) such as in a resorcinol/HMTA in situ resin system, where oxygen and moisture levels are sufficiently high, can tend to have poor aged-adhesion to brass or brass-coated steel. The use of BTA and/or CHAB is particularly beneficial in such systems. Further, BTA coatings on in-process wire protect the wire from eleterious effects of moisture (humidity) and oxidation, i.e., improve factory storage life.

BTA is well known in the art and preparation is described in the literatire, viz., "Aromatic Triazoles Inhibit Corrosion of Copper and Copper Alloys", C. J. Korpics, Materials Performance, Feb. (1974) and "COBRATEC", Technical Bulletin No. 531, The Sherwin-Williams Company.

The structural formula for cyclohexylamine borate is:

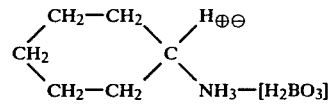

CHAB is supplied by U.S. Borax and Chemical Corp. CHAB can be prepared according to U.S. Pat. No. 3,360,390, "Use of Alkylamine Borates as Corrosion Inhibitor for Ferrous Metal", U.S. Borax and Chemical Corp., Los Angeles, California.

By the term "high-carbon" steel as used in the present specification and claims, applicants are referring to what is known as carbon steel, also called ordinary steel, also called straight carbon steel or plain carbon steel, e.g., American Iron and Steel Institute Grade 1070 high-carbon steel (AISI 1070). Such steel owes its properties chiefly to the presence of carbon without substantial amounts of other alloying elements. In this respect see Metals Handbook, The American Society for Metals, Metals Park, Cleveland, Ohio.

By "brass" applicants refer to alpha brass or compositions in which the major component is alpha brass, i.e., which contain from about 65 to 75 percent copper and 35 to 25 percent zinc, respectively.

The following examples contain illustrations of, but do not limit the practice of the present invention.

The following experimental procedures were used in all the working examples contained herein. Exceptions or additions to these procedures, if applicable, are given in the respective example.

Brass-plated (68.3±0.3%, Cu, 31.7±0.3% Zn, coating weight =5.13±0.13 gram brass per KG steel wire) steel (AISI grade 1070) cable having a 5×.25 construction was used in all of the examples.

Rubber compound A was prepared using the following formulation.

| Ingredients | Parts by Weight |
| --- | --- |
| Natural rubber | 100 |
| Peptizer | 0.1 |
| Resorcinol | 3 |
| Processing oil | 10 |
| Stearic acid | 2 |
| Furnace black | 55 |
| Zinc oxide | 10 |
| Hexamethylene tetramine | 2 |
| Antioxidant | 0.75 |
| Accelerator | 1 |
| Retarder | 5 |
| Sulfur | 5 |

Rubber B was the same as A with the exception that silica was substituted for the carbon black.

Rubber C was the same as A with the following exceptions. Cobalt naphthanate (2.5 parts) replaced the resorcinol and hexamethylene tetramine, and the accelerator and sulfur levels were changed to 0.5 and 8 parts respectively.

Rubber D was the same as Rubber C with the exception that the accelerator and sulfur levels were 3 and 6.5 parts respectively.

The metal cord used was brass-plated steel (AISI 1070) wire which was cold drawn from 1.14 mm to 0.25 mm by using a Vaughn Drawing Machine and a standard lubricant having an oleic acid base. Cables (5×.25) were made by using standard bunching and/or stranding equipment.

Surface treatments of the wire were accomplished by dipping cables in test solutions at 60° C. for one minute followed by drying by a blast of hot air. Standard static adhesion test blocks were used having ½ inch cable imbedment. All blocks were vulcanized at 300° F. for 30 minutes and 28,000 pounds pressure.

Original static adhesion measurements were made after vulcanization and room temperature aging of the vulcanizate for 24 hours.

Humidity-aged adhesion measurements were made on vulcanized blocks after aging for 6 hours at 150° C. in a pressurized cylinder (4–60 psi) filled with air containing a significant moisture content. The blocks were allowed to stabilize at ambient temperature and pressure for 24 hours before testing.

The salt water immersion corrosion-aging adhesion measurements were made after total immersion of the vulcanized adhesion blocks in a 5 percent NaCl aqueous solution at 90° C. for a specified period of time. The blocks were allowed to stabilize for 24 hours at room temperature in air before pulling.

The green-block humidity aging measurements were made on unvulcanized adhesion blocks which had been aged at 25° C., 38° C. and 77° C. and 98 percent relative humidity for 3 and 7 days before vulcanization. Static adhesion was then measured in standard manner (ASTM Designation D 2229-73 "Standard Method of Testing for Adhesion of Vulcanized Rubber to Steel Cord").

Adhesion is defined herein as being a function of the interfacial bonding strength between brass-coated steel cord surface and rubber matrix measured by (1) force in pounds (lbs) required to pull the test cord from a standard static adhesion block having ½ inch imbedment of metal into rubber by using standard Instron testing machine and (2) the percent rubber coverage (RC) remaining on the ½ inch metal imbedment after pulling the cord out of the adhesion block, as visually estimated.

Adhesion values herein are calculated according to the following relationship.

$$\text{Adhesion} = \frac{\frac{\text{Pounds Pull (experimental)}}{\text{Pounds Pull (control)}} + \frac{\text{R/C (experimental)}}{\text{R/C (control)}}}{2} \times 100$$

The control involved the use of the clean, untreated cord.

Brass coated steel wire was treated with various compounds and stored at 100° F. and 90 percent relative humidity for 350 hours. The wire was then evaluated microscopically to determine the percent of the surface covered with rust.

TABLE 1

| Treatment | Rust Coverage (%) after 350 Hrs. |
| --- | --- |
| None | 100 |
| CHAB | 90–100 |
| Sodium chromate and sodium phosphite | 60–75 |
| CHAB + BTA | 25–35 |
| BTA | 0–5 |

As shown above, BTA treatment was far superior to any other treatment.

In this respect it should be noted that none of the treatments offer significant beneficial effects if the wire is substantially corroded before the treatment is accomplished.

Wire was dipped in aqueous BTA solutions. Adhesion ratings are given in Table 2.

TABLE 2

Effect of Benzotriazole Dip Concentration on Adhesion Levels

Wire Treatment:
  I: Control
  II: 1 W/O*   Benzotriazole (BTA) in water
  III: 2 W/O   BTA in water
  IV: 4 W/O   BTA in water
  V: 6 W/O    BTA in water
Results: Adhesion Rating
  (All in Compound A)

| Wire Treatment | Original Static Adhesion | Humidity Aged | Salt Water Corrosion Aged ½ Hr | Salt Water Corrosion Aged 4 Hrs | % Change of Adhesion After 4 Hours Corrosion |
| --- | --- | --- | --- | --- | --- |
| I | 100 | 40 | 82 | 47 | −53 |
| II | 98 | 47 | 95 | 56 | −43 |
| III | 105 | 50 | 99 | 55 | −48 |
| IV | 102 | 50 | 81 | 59 | −42 |
| V | 76 | 47 | 77 | 81 | +8 |

*W/O = percent by weight

As indicated by the above data, BTA treatment improved both humidity aged and salt water aged adhesion.

TABLE 3

Improved Adhesion of Brass-Coated Steel Tire Cord Achieved by Using Benzotriazole Additions to Standard Oleic Acid Base Drawing Lubricant Wire Treatment:
  I: As drawn using standard lubricant
  II: Standard lubricant + 0.05 W/O BTA added
  III: Standard lubricant + 0.5 W/O BTA added
Results: Adhesion Ratings
  Salt-Water

TABLE 3-continued

Improved Adhesion of Brass-Coated Steel Tire Cord Achieved by Using Benzotriazole Additions to Standard Oleic Acid Base Drawing Lubricant

| Wire Treatment | Rubber | Original Adhesion | Humidity Aged | Corrosion Aged | | |
|---|---|---|---|---|---|---|
| | | | | 4 Hrs | 8 Hrs | 24 Hrs |
| I | A | 100 | 56 | 16 | 15 | 9 |
| II | A | 102 | 63 | 20 | 17 | 11 |
| III | A | 100 | 59 | 22 | 22 | 33 |
| I | B | 100 | 70 | 50 | 47 | 33 |
| II | B | 170 | 91 | 54 | 81 | 42 |
| III | B | 155 | 75 | 69 | 49 | 34 |
| I | C | 100 | 55 | 85 | 101 | 43 |
| II | C | 114 | 60 | 105 | 109 | 58 |
| III | C | 133 | 89 | 102 | 130 | 78 |

Again the overall adehsion ratings using BTA were superior.

TABLE 4

Improved Adhesion of Brass-Coated Steel Tire Cord Treated With Benzotriazole and Aged 100 Days in a Factory Environment at Room Temperature Wire Conditions:

TABLE 4-continued

Improved Adhesion of Brass-Coated Steel Tire Cord Treated With Benzotriazole and Aged 100 Days in a Factory Environment at Room Temperature I: Control
II: Dipped 2 W/O aqueous BTA
III: Standard lubricant + 0.05 W/O BTA
IV: Standard lubricant + 0.05 W/O BTA then dipped in 2 W/O aqueous BTA
V: Standard lubricant + 0.5 W/O BTA
VI: Standard lubricant + 0.5 W/O BTA then dipped in 2 W/O aqueous BTA Results: Adhesion Ratings (All Compound A)

| Wire Condition | Original Adhesion | Humidity Aged | Salt-Water Corrosion Aged | | |
|---|---|---|---|---|---|
| | | | 4 Hrs | 8 Hrs | 24 Hrs |
| I | 100 | 45 | 49 | 48 | 33 |
| II | 102 | 52 | 71 | 55 | 43 |
| III | 113 | 48 | 66 | 72 | 52 |
| IV | 96 | 47 | 82 | 64 | 35 |
| V | 103 | 51 | 71 | 61 | 41 |
| VI | 99 | 48 | 78 | 55 | 39 |

As indicated above BTA improved the overall adhesion properties.

TABLE 5

Improved Adhesion of Untreated Brass-Coated Steel Tire Cord to Rubber Containing Benzotriazole Results: Adhesion Ratings

| Test Conditions | Control Compound D (No Additions) | Comp. D + 2.0 Parts BTA | Comp. D + 1.0 Part BTA | Comp. D + 0.5 Part BTA | Comp. D + 0.25 Part BTA | Comp. D + 0.10 Part BTA | Comp. A (No Additions) |
|---|---|---|---|---|---|---|---|
| Original Hot Adhesion 46 min/300° F. | 100 | 100 | 101 | 123 | 115 | 126 | 130 |
| Hot Adhesion 46 min/300° F. Green Block Aged in Ambient Air | | | | | | | |
| 1 Day | 114 | 112 | 104 | 114 | 117 | 118 | 130 |
| 7 Days | 117 | 111 | 112 | 121 | 122 | 117 | 141 |
| 14 Days | 119 | 119 | 126 | 119 | 121 | 119 | 126 |
| Hot Adhesion 46 min/300° F. Green Block Aged at 98% Relative Humidity and 100° F. | | | | | | | |
| 3 Days | 94 | 86 | 105 | 117 | 122 | 114 | 88 |
| 7 Days | 60 | 107 | 109 | 103 | 113 | 122 | 75 |
| 14 Days | 90 | 87 | 88 | 104 | 99 | 110 | 86 |
| Hot Adhesion 46 min/300° F. Cured Block Aged at 98% Relative Humidity and 170° F. | | | | | | | |
| 3 Days | 76 | 104 | 93 | 107 | 103 | 111 | 60 |
| 7 Days | 86 | 90 | 75 | 79 | 92 | 71 | 52 |

TABLE 6

Improved Adhesion of Brass-Coated Steel Tire Cord Treated in Benzotriazole, Cyclohexylamine Borate, or a Combination of Benzotriazole and Cyclohexylamine Borate Results: Adhesion Rating (all in Compound A)

| Wire Treatment | Orignal Adhesion | Humidity Aged | Salt Water Corrosion Aged | | |
|---|---|---|---|---|---|
| | | | 4 Hours | 8 Hours | 24 Hours |
| Control | 100 | 34 | 35 | 30 | 25 |
| Dipped in 0.5 W/O BTA in alcohol | 126 | 36 | 60 | 32 | 29 |
| Dipped in 2.0 W/O BTA in alcohol | 107 | 41 | 73 | 32 | 30 |
| Dipped in 0.01M cyclohexylamine diborate in alcohol | 122 | 42 | 88 | 71 | 33 |
| Dipped in 0.01M cyclohexylamine diborate + 2W/O BTA in alcohol | 102 | 39 | 67 | 31 | 38 |
| Dipped in 0.01M cyclohexylamine tetraborate in alcohol | 118 | 41 | 103 | 56 | 39 |
| Dipped in 0.01M cyclohexylamine diborate + 0.01M cyclohexylamine tetraborate + 2 W/O BTA in alcohol | 112 | 43 | 56 | 35 | 27 |

TABLE 6-continued

Improved Adhesion of Brass-Coated Steel Tire Cord Treated in Benzotriazole,
Cyclohexylamine Borate, or a Combination of Benzotriazole and Cyclohexylamine Borate
Results: Adhesion Rating (all in Compound A)

| Wire Treatment | Original Adhesion | Humidity Aged | Salt Water Corrosion Aged | | |
|---|---|---|---|---|---|
| | | | 4 Hours | 8 Hours | 24 Hours |
| Dipped in 0.01M cyclohexylamine tetraborate + 2 W/O BTA in alcohol | 101 | 40 | 83 | 39 | 30 |

The data in Table 5 indicate that even low levels of BTA can be quite effective.

The treated wire in Table 6 again exhibited superior overall adhesion when compared with untreated wire.

Brass coated steel cord was treated using sequential addition of the CHAB and BTA at different concentrations in alcohol (CHAB) and water (BTA), the cord being dipped first in the CHAB solution and then the BTA solution. Again the overall adhesion properties were improved. Compound A was the rubber used.

Water is a preferred solvent since its use results in improved adhesions due to possible interaction of the water with the coatings on the wire.

While certain representative embodiments and details have been shown for the purpose of illustrating the invention, it will be apparent to those skilled in this art that various changes and modifications may be made therein without departing from the spirit or scope of the invention.

I claim:

1. A method of improving the adhesion between brass-coated steel tire cord and rubber comprising (A) treating the brass-coated steel tire cord with benzotriazole to form a layer of polymeric complex of benzotriazole and copper over substantially all of the brass surface and (B) vulcanizing a composite of the treated cord and rubber; where at least one portion of the benzotriazole is added to the rubber adjacent to the cord.

2. The method according to claim 1 where said rubber contains cobalt naphthenate.

3. The vulcanized composite produced according to the method of claim 1.

4. The vulcanized composite produced according to the method of claim 2.

5. The method according to claim 1 in which 100 parts by weight of the rubber composite contains in the range of 0.1 to 2 parts by weight benzotriazole and is comprised of rubber, peptizer, processing oil, stearic acid, carbon black, zinc oxide, antioxidant, accelerator, retarder, cobalt naphthenate and sulfur.

6. The vulcanized composite produced according to the method of claim 5.

7. A method of improving the adhesion between rubber and brass-plated steel cord reinforcement which comprises adding benzotriazole to the rubber adjacent to the cord.

8. The method according to claim 7 where said rubber contains cobalt naphthenate.

9. The vulcanized composite produced according to the method of claim 7.

10. The vulcanized composite produced according to the method of claim 8.

11. The method according to claim 7 in which 100 parts by weight of the rubber composite contains in the range of 0.1 to 2 parts by weight benzotriazole and is comprised of rubber, peptizer, processing oil, stearic acid, carbon black, zinc oxide, antioxidant, accelerator, retarder, cobalt naphthenate and sulfur.

12. The vulcanized composite produced according to the method of claim 11.

13. The method of claim 7 in which the rubber composite contains in the range of 0.1 to 2 parts by weight benzotriazole and is composed of, based on a parts by weight basis, 100 parts natural rubber, 0.1 parts peptizer, 10 parts processing oil, 2 parts stearic acid, 55 parts furnace black, 10 parts zinc oxide, 0.75 parts antioxidant, 1 part accelerator, 3 parts retarder, 6.5 parts sulfur and 2.5 parts cobalt naphthenate.

14. The vulcanized composite produced according to the method of claim 13.

* * * * *